US012643504B2

(12) United States Patent
Kim et al.

(10) Patent No.: US 12,643,504 B2
(45) Date of Patent: Jun. 2, 2026

(54) APPARATUS FOR CLEANING A SENSOR

(71) Applicants: HYUNDAI MOTOR COMPANY, Seoul (KR); KIA CORPORATION, Seoul (KR)

(72) Inventors: Kyung Hwan Kim, Seoul (KR); Sang Heon Wang, Hwaseong-si (KR); Dong Eun Cha, Hwaseong-si (KR); Nak Kyoung Kong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 307 days.

(21) Appl. No.: 18/374,999

(22) Filed: Sep. 29, 2023

(65) Prior Publication Data
US 2024/0198974 A1    Jun. 20, 2024

(30) Foreign Application Priority Data
Dec. 19, 2022    (KR) ........................ 10-2022-0178543

(51) Int. Cl.
*B60S 1/52* (2006.01)
*B60S 1/56* (2006.01)

(52) U.S. Cl.
CPC ................. *B60S 1/528* (2013.01); *B60S 1/56* (2013.01)

(58) Field of Classification Search
CPC ................................... B60S 1/56; B60S 1/528
See application file for complete search history.

(56) References Cited

U.S. PATENT DOCUMENTS

| | | | |
|---|---|---|---|
| 10,457,253 B2 | 10/2019 | Trebouet et al. | |
| 11,142,170 B2 * | 10/2021 | Glickman | B60S 1/528 |
| 2015/0040953 A1 * | 2/2015 | Kikuta | B60S 1/56 |
| | | | 134/123 |
| 2015/0078940 A1 * | 3/2015 | Kikuta | F04B 17/03 |
| | | | 417/443 |
| 2016/0339875 A1 * | 11/2016 | Ina | B60S 1/522 |
| 2017/0021809 A1 | 1/2017 | Trebouet et al. | |
| 2018/0086316 A1 * | 3/2018 | Trebouet | G02B 27/0006 |
| 2018/0304861 A1 * | 10/2018 | Picot | B60S 1/56 |
| 2018/0304862 A1 * | 10/2018 | Picot | B60S 1/56 |
| 2018/0304863 A1 * | 10/2018 | Picot | B60S 1/56 |
| 2019/0219043 A1 * | 7/2019 | Kikuta | F04B 53/10 |
| 2020/0130652 A1 * | 4/2020 | Richardson | B60S 1/0411 |

(Continued)

FOREIGN PATENT DOCUMENTS

| | | | | | |
|---|---|---|---|---|---|
| CN | 113195315 A | * | 7/2021 | | H04N 23/50 |
| DE | 4329405 B4 | * | 12/2005 | | B60S 1/528 |

(Continued)

*Primary Examiner* — Benjamin L Osterhout
(74) *Attorney, Agent, or Firm* — Lempia Summerfield Katz LLC

(57) ABSTRACT

An apparatus for cleaning a sensor includes: a sensor that is positioned in a vehicle; a sensor bearing unit that is positioned on a vehicle body adjacent to the sensor, and at least one nozzle assembly that is positioned in the sensor bearing unit. The at least one nozzle assembly stands up by a hydraulic pressure of inflowing washer fluid. The apparatus also includes: a washer fluid passage that is in fluid connection with the nozzle assembly and through which washer fluid flows; and a motor unit that is configured to apply a driving force so that the sensor bearing unit rotates based on the sensor.

18 Claims, 6 Drawing Sheets

(56)    References Cited

U.S. PATENT DOCUMENTS

| | | | |
|---|---|---|---|
| 2020/0324739 A1 * | 10/2020 | Singh .................. | B62D 25/085 |
| 2020/0391231 A1 * | 12/2020 | Arunmozhi .......... | F16L 27/023 |
| 2021/0146406 A1 | 5/2021 | Sykula et al. | |
| 2022/0009453 A1 * | 1/2022 | Rachow ................... | B60S 1/56 |

FOREIGN PATENT DOCUMENTS

| | | | | |
|---|---|---|---|---|
| DE | 102015015910 B3 * | 6/2017 | .............. | B60S 1/528 |
| DE | 112017001606 T5 * | 12/2018 | ............ | H04N 23/00 |
| DE | 102018132368 A1 * | 6/2019 | .......... | G01S 17/931 |
| EP | 0508853 A1 * | 10/1992 | .......... | B60Q 1/0005 |
| EP | 2845773 A1 * | 3/2015 | ............ | B60S 1/0848 |
| EP | 3992039 A1 * | 5/2022 | .............. | B60S 1/528 |
| FR | 3120221 A1 * | 9/2022 | ............... | B60S 1/56 |
| JP | 2019006387 A * | 1/2019 | | |
| KR | 20170012125 A | 2/2017 | | |
| KR | 20170087485 A * | 7/2017 | ......... | G02B 27/0006 |
| WO | WO-2015110439 A1 * | 7/2015 | .............. | B60S 1/528 |
| WO | WO-2016074933 A1 * | 5/2016 | ............... | B60S 1/56 |
| WO | WO-2018059807 A1 * | 4/2018 | .............. | B60S 1/528 |
| WO | WO-2020092201 A1 * | 5/2020 | ......... | G02B 27/0006 |

* cited by examiner

CENTRAL AXIS

10

230(200)

330(300)

210(200)

320(300)

220(200)

400

321(300)

510

500

[ BEFORE OPERATION ]    [ AFTER OPERATION ]

APPARATUS FOR CLEANING A SENSOR

CROSS-REFERENCE TO RELATED APPLICATION

This application claims the benefit of and priority to Korean Patent Application No. 10-2022-0178543, filed on Dec. 19, 2022, the entire contents of which are incorporated herein by reference.

BACKGROUND

(a) Technical Field

The present disclosure relates to an apparatus for cleaning a sensor. More particularly, the present disclosure relates to an apparatus for cleaning a sensor that allows various light detection and ranging (LIDAR) sensors to be cleaned universally regardless of a size and a field of view (FOV) area of the LIDAR sensor.

(b) Background Art

In general, a light detection and ranging (LIDAR) sensor with high distance resolution is desired for the purpose of autonomous driving level 3, which requires functions like autonomous parking and autonomous driving on highways.

Such a LIDAR sensor can detect various objects, such as other vehicles, pedestrians, road signs, and any other structures in the vicinity of the vehicle (e.g., in front and behind of the vehicle).

Usually, the LIDAR sensor is mounted on a front bumper of a vehicle and positioned externally to prevent any potential deterioration in detection performance. This approach ensures optimal detection performance by avoiding the installation of the LIDAR sensor within other structures, such as glass or a vehicle body, which could significantly reduce the LIDAR sensor's detection performance.

Such a LIDAR sensor includes a laser transmitter, a laser receiver, a driver unit, and the like, and also includes a cover for protecting the sensor from external contaminants.

For example, the LIDAR sensor can detect distance through transmitting and receiving light, and thus the presence of the cover is required. Therefore, the LIDAR sensor is inevitably very sensitive to any external contamination on the cover. Accordingly, preventing the contamination of the LIDAR sensor (e.g., contamination on its cover) is important for maintaining the performance of the LIDAR sensor.

To this end, an apparatus for cleaning a sensor can be used alongside a washer pump of a reservoir. This apparatus may deliver the washer fluid in the reservoir to a cleaning nozzle via a hose using the pressure to spray the washer fluid through the nozzle. This process removes foreign matters present in the field of view (FOV) area of the LIDAR sensor and perform a function of cleaning the LIDAR sensor.

However, since LIDAR sensors have different sizes and FOV areas depending on part suppliers or the performance of the LIDAR sensors, it is desired to develop a separate nozzle suitable for various sizes and FOV areas of the LIDAR sensor when applying the apparatus for cleaning a sensor to the vehicle.

In addition, when cleaning a sensor that protrudes in the vertical direction, such as a LIDAR sensor, there is a problem in ensuring thorough cleaning of the contaminated areas. Spraying washer fluid from the bottom or top of the sensor may not provide sufficient cleaning of these contaminated locations, and it can lead to secondary contamination of the surrounding area where the sensor is positioned.

The foregoing is intended merely to aid in understanding the background of the present disclosure. The foregoing is not intended to mean that the present disclosure falls within the purview of the related art that is already known to those having ordinary skill in the art.

SUMMARY

The present disclosure provides an apparatus for cleaning a sensor capable of effectively cleaning any contamination present not only on the sensor itself but also on the areas adjacent to the sensor.

In another embodiment, the present disclosure provides an apparatus for cleaning a sensor in which a nozzle assembly moves to a contaminated area of the sensor and the nozzle assembly stands up to spray (e.g., inject) washer fluid on to the sensor.

Objects of the present disclosure are not limited to the above-mentioned object. Other objects of the present disclosure that are not mentioned may be understood by the following description and should be more clearly appreciated by embodiments of the present disclosure. Also, the objects of the present disclosure may be realized by the means and combinations indicated in the claims.

An apparatus for cleaning a sensor for achieving the object of the present disclosure described above includes the following configuration.

According to an embodiment of the present disclosure, the apparatus for cleaning a sensor includes a sensor that is positioned in a vehicle, and a sensor bearing unit that is positioned on a vehicle body adjacent to the sensor. The apparatus also includes at least one nozzle assembly that is positioned in the sensor bearing unit and is configured to stand up by a hydraulic pressure of inflowing washer fluid. The apparatus also includes a washer fluid passage that is in fluid connection with the nozzle assembly and through which washer fluid flows. The apparatus also includes a motor unit that is configured to apply a driving force so that the sensor bearing unit rotates based on the sensor.

The sensor bearing unit may include a housing to which the nozzle assembly is fastened, and a gear unit that is positioned inside the housing and fastened to a rotational shaft of the motor unit. The sensor bearing unit also includes bearings that are positioned outside the sensor and inside the housing.

The washer fluid passage may be configured to be fastened to the nozzle assembly along the same shaft as the rotational shaft of the sensor bearing unit.

The washer fluid passage may include a washer fluid bearing that is formed at a position corresponding to the same shaft as the rotational shaft of the sensor bearing unit.

The nozzle assembly may include a nozzle housing that is fastened to the washer fluid passage, and a nozzle unit that sprays the washer fluid flowing into the nozzle housing. The nozzle assembly also includes a link unit that is positioned between the nozzle housing and the nozzle unit.

The link unit may include a first link that has one end fastened to the nozzle unit and the other end rotating along a sensor bearing unit. The link unit may also include a second link that is fixed to the nozzle housing and pops up along a height direction from the nozzle housing in response to the hydraulic pressure of the washer fluid. The link unit may further include a third link that applies force so that the first link stands up when one end is fastened to the second link, and the other end is fastened to the first link so that the second link pops up.

When the washer fluid flows into the nozzle housing, the second link may pop up, one end of the third link that is connected to the second link may integrally move with the second link along the height direction, and the other end of the third link may integrally rotate with the first link.

The nozzle unit may include at least one injection passage along a longitudinal direction of the nozzle unit. The injection passage is configured to spray the washer fluid toward a lower end of the sensor.

In another embodiment of the present disclosure, an apparatus for cleaning a sensor includes a sensor that is positioned in a vehicle, and a sensor bearing unit that is positioned on a vehicle body adjacent to the sensor. The apparatus also includes at least one nozzle assembly that is positioned in the sensor bearing unit and is configured to stand up by a hydraulic pressure of inflowing washer fluid. The apparatus also includes a washer fluid passage that is in fluid connection with the nozzle assembly and through which washer fluid flows. The apparatus also includes a motor unit that is configured to apply a driving force so that the sensor bearing unit rotates based on the sensor. The apparatus also includes a control unit that rotates the sensor bearing unit in response to a contaminated location of the sensor and applies the washer fluid to the nozzle assembly.

The sensor bearing unit may include a housing to which the nozzle assembly is fastened, and a gear unit that is positioned inside the housing and fastened to a rotational shaft of the motor unit. The sensor bearing unit also includes bearings that are positioned outside the sensor and inside the housing.

The control unit may control to drive the motor unit so that the sensor bearing unit moves in response to the contaminated location of the sensor, and control to apply the washer fluid to the nozzle assembly.

The control unit may control the washer fluid to be applied to the nozzle assembly simultaneously with driving of the motor unit when the contaminated location of the sensor is determined.

The nozzle assembly may include a nozzle housing that is fastened to the washer fluid passage, and a nozzle unit that sprays the washer fluid flowing into the nozzle housing. The nozzle assembly may include a link unit that is positioned between the nozzle housing and the nozzle unit.

The link unit may include a first link that has one end fastened to the nozzle unit and the other end rotating along a sensor bearing unit. The link unit may also include a second link that is fixed to the nozzle housing and pops up along a height direction from the nozzle housing in response to the hydraulic pressure of the washer fluid. The link unit may also include a third link that applies force so that the first link stands up when one end is fastened to the second link and the other end is fastened to the first link so that the second link pops up.

When the washer fluid flows into the nozzle housing, the second link may pop up, one end of the third link that is connected to the second link may integrally move with the second link along the height direction, and the other end of the third link may integrally rotate with the first link.

The nozzle unit may include at least one injection passage along a longitudinal direction of the nozzle unit. The injection passage is configured to spray the washer fluid toward a lower end of the sensor.

The washer fluid passage may include a washer fluid bearing that is formed at a position corresponding to the same shaft as the rotational shaft of the sensor bearing unit.

The washer fluid bearing may include an inner ring in which the washer fluid passage is positioned, and an outer ring configured to surround the inner ring to have a predetermined distance from the inner ring. The washer fluid may also include a roller unit that is positioned between the inner ring and the outer ring and is configured so that the inner ring rotates based on the outer ring.

BRIEF DESCRIPTION OF THE DRAWINGS

The above and other features of the present disclosure are now described in detail with reference to certain examples thereof illustrated in the accompanying drawings, which are given herein below by way of illustration only, and thus are not limitative of the present disclosure, and wherein.

Figure 1:
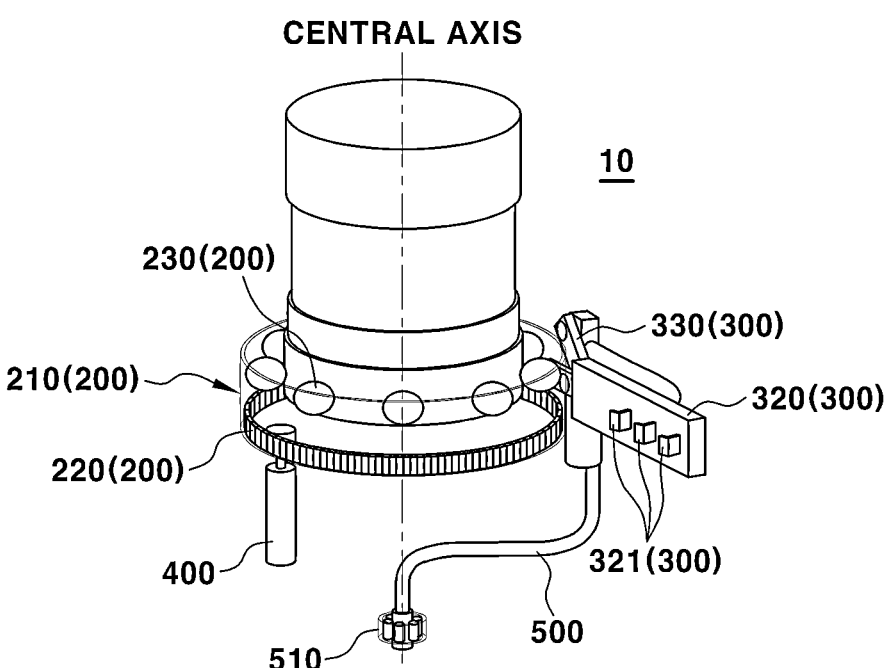
FIG. 1 is a perspective view of an apparatus for cleaning a sensor according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes should be determined in section by the particular intended application and use environment.

In the figures, reference numbers refer to the same or equivalent sections of the present disclosure throughout the several figures of the drawing.

DETAILED DESCRIPTION

Hereinafter, embodiments of the present disclosure are described in more detail with reference to the accompanying drawings. Embodiments of the present disclosure may be modified in various forms, and the scope of the present disclosure should not be construed as being limited to the following examples. The present embodiments are provided so that this disclosure is thorough and complete, and fully conveys the concept of the disclosure to those having ordinary skill in the art.

In addition, the terms " . . . er/or," " . . . unit," " . . . module," or the like described in the specification mean a processing unit of at least one function or operation and may be implemented by hardware or software or a combination of hardware and software.

In addition, the terms used in the present specification are used only in order to describe specific embodiments rather than limiting the present embodiment. Singular forms are intended to include plural forms unless the context clearly indicates otherwise.

In addition, in this specification, dividing names of components into first, second, third, and the like is to divide the names because the names of the components are the same configuration as each other, and are not to be necessarily limited to a sequence thereof.

Various embodiments of the present disclosure may be implemented by software (e.g., program) including instructions stored in a machine (e.g., computer)-readable storage medium (e.g., a computer-readable storage medium). A machine is a device capable of calling a stored instruction from a storage medium and operating according to the called instruction. The machine may include the electronic device (e.g., server) of the disclosed embodiments. The command may include codes created or executed by a compiler or an interpreter. The machine-readable storage medium may be provided in a form of a non-transitory storage medium. The term "non-transitory" means that the storage medium is tangible without including a signal, and does not distinguish whether data are semi-permanently or temporarily stored in the storage medium.

When a component, device, element, or the like of the present disclosure is described as having a purpose or performing an operation, function, or the like, the component, device, or element should be considered herein as being "configured to" meet that purpose or perform that operation or function.

Hereinafter, an embodiment of the present disclosure is described in detail with reference to the accompanying drawings. In describing an embodiment of the present disclosure with reference to the accompanying drawings, components that are the same as or correspond to each other are denoted by the same reference numerals, and an overlapped description thereof is omitted.

The present disclosure relates to an apparatus 10 for cleaning a sensor 100. A nozzle unit 320 is configured to be switched from a mounting state to a standing state in response to a hydraulic pressure of washer fluid, pop up along a height direction of the sensor 100, and spray (e.g., inject) the washer fluid on to a contaminated area of the sensor 100 along the popped-up nozzle unit 320.

Figure 2:
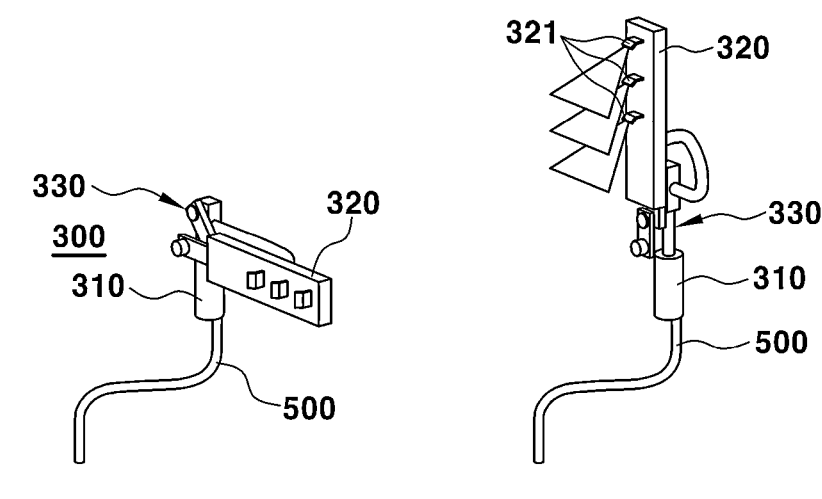
FIG. 2 is a configuration diagram of an apparatus for cleaning a sensor according to an embodiment of the present disclosure.
Figure 2:
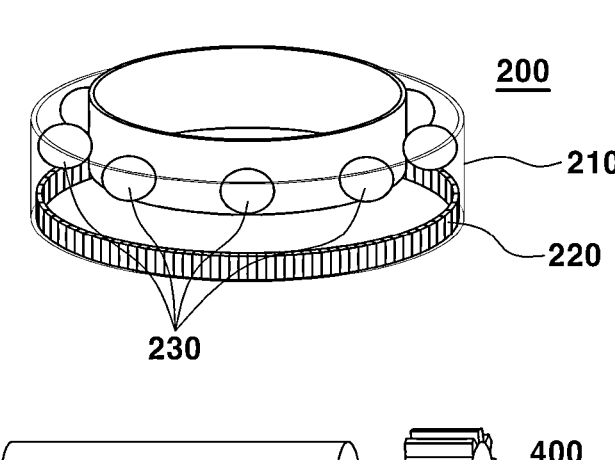
Figure 2:
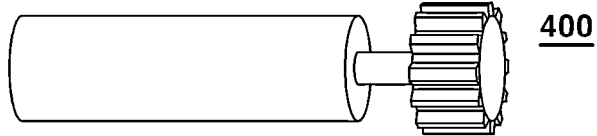

FIG. 1 illustrates a perspective view of the apparatus 10 for cleaning a sensor 100 according to an embodiment of the present disclosure. FIG. 2 illustrates a configuration diagram of the apparatus 10 for cleaning a sensor 100 according to the embodiment of the present disclosure.

The sensor 100 is configured to be positioned on and fixed to an outer side surface (e.g., exterior surface) of a vehicle and measure the driving environment of the vehicle. In the embodiment of the present disclosure, the sensor 100 may be configured as a cylindrical light detection and ranging (LIDAR) sensor. The LIDAR sensor serves to emit and detect laser light in a preset direction to discriminate or measure the distance between surrounding objects and discern the shapes of the surrounding objects. The LIDAR sensor applied to a vehicle generally serves to scan and collect terrain and obstacle surface information corresponding to the surrounding area of interest in real-time while the vehicle is moving.

The LIDAR sensor has a similar principle to radar, but there is a difference in that the radar emits electromagnetic waves to the outside and checks the distance and direction with electromagnetic waves that are re-received. However, the LIDAR sensor emits laser light. Since the LIDAR sensor uses laser light with a short wavelength, the LIDAR has the advantage of high precision and resolution. Additionally, the LIDAR sensor is able to identify objects three-dimensionally according to the objects.

Moreover, in an embodiment of the present disclosure, the sensor 100 may be configured as a radar, and the radar is a system that combines ultra-wideband communication (UWB) technology with radar. The sensor refers to a radar technology that transmits an impulse signal of a very short duration having wideband characteristics in a frequency domain and receives a signal reflected and return from an object or a person to perceive the surrounding situations.

The radar system generates an impulse signal having a time width of several nanoseconds to several picoseconds in a signal generator. The radar system radiates the received impulse signal at a wide angle or a narrow band through a transmitting antenna. The radiated signal is reflected by various objects or people in the environment. The reflected signal may be converted into a digital signal through a receiving antenna and an analog-to-digital converter (ADC).

The sensor 100 as described above may be configured to be positioned to be fixed to a vehicle body and positioned so that a portion of the sensor 100 protrudes to the outside of the vehicle. Accordingly, the apparatus 10 for cleaning a sensor 100 may be configured to surround the protruding outer side surface of the sensor 100.

Moreover, the apparatus 10 for cleaning a sensor 100 of the present disclosure includes a sensor bearing unit 200 that is positioned adjacent to the sensor 100 to maintain a regular interval (e.g., consistent distance) on the outer side surface of the sensor 100. The apparatus 10 also includes a nozzle assembly 300 positioned on the outer side surface of the sensor bearing unit 200.

The sensor bearing unit 200 includes a housing 210 that is configured to surround the outer side surface of the sensor 100. The sensor bearing unit 200 also includes a gear unit 220 that is positioned on an inner circumferential surface of the housing 210 and fastened to the motor unit 400 so that the driving force of the motor unit 400 is transmitted. More specifically, the housing 210 may be configured to surround the outer side surface of the sensor 100 corresponding to a 360° sensing area of the sensor 100. In addition to this, the housing 210 of the sensor bearing unit 200 is positioned so that the nozzle assembly may move corresponding to the sensing area of the sensor 100.

Further, the apparatus 10 for cleaning the sensor 100 includes a bearing 230 that is positioned between the vehicle body and the housing 210 to maintain a low friction state with the vehicle body when the housing 210 rotates based on the vehicle body. In an embodiment of the present disclosure, the bearing 230 may be configured in a ball shape, and at least one bearing 230 may be configured to be positioned between the housing 210 and the vehicle body so that the sensor bearing unit 200 may freely rotate based on the vehicle body.

The nozzle assembly 300 is mounted parallel to the sensor bearing unit 200 based on the height direction in which the sensor 100 protrudes before the request for cleaning is applied. Moreover, when the request for cleaning the contaminated area of the sensor 100 is applied (e.g., initiated) from the control unit 600, the nozzle assembly 300 is switched to a standing state, which is a horizontal position relative to the height direction of the sensor 100, based on the sensor bearing unit 200.

The nozzle assembly 300 includes a nozzle housing 310 that is configured to be in fluid connection with a washer fluid passage 500. The nozzle housing 310 allows washer fluid to flow into the nozzle assembly 300. The nozzle assembly 300 also includes a nozzle unit 320 that is selectively configured at a position adjacent to the sensor 100 so that the washer liquid flowing into the nozzle housing 310 is sprayed on to the sensor 100. Additionally, the nozzle assembly 300 includes a link unit 330 that is positioned between the nozzle housing 310 and the nozzle unit 320 so that the nozzle unit 320 is mounted on the sensor bearing unit 200. The nozzle unit 320 then stands up by the hydraulic pressure of the washer fluid flowing into the nozzle housing 310.

The nozzle unit 320 includes at least one injection passage 321 for spraying the washer fluid to the outer side surface of the sensor 100 along the longitudinal direction of the nozzle unit 320. The number of injection passages 321 is set based on the protruding height of the sensor 100 and the length of the nozzle unit 320. In an embodiment of the present disclosure, the nozzle unit 320 may include three injection passages 321. The injection passages 321 are configured to spray the washer fluid toward a lower end of the sensor 100. More specifically, the injection passages 321 may be configured to have an injection angle (e.g., a spray angle) so that the washer fluid flows from a position adjacent to an upper end of the sensor to the lower end of the sensor 100.

The link unit 330 may be configured as a three-bar link, and includes a first link 331, a second link 332, and a third link 333. The first link 331 has one end fastened to the nozzle unit 320 and the other end positioned in the bearing unit 230 of the sensor 100. The second link 332 is positioned in the nozzle housing 310 and pops up along a longitudinal direction of the nozzle housing 310 in response to the hydraulic pressure of the washer fluid flowing into the nozzle housing 310. Additionally, the third link 333 is fastened between both ends of the first link 331 and applies a rotational force to the first link 331 so that the first link 331 stands up when the second link 332 pops up.

More specifically, the first link 331, the second link 332, and the third link 333 are positioned so as not to interfere with each other along the width direction. The first link 331 and the third link 333 are configured to rotate in response to the movement of the second link 332 in the longitudinal direction. In addition, the third link 333 rotates based on one end being fastened to the second link 332, and the first link 331 is configured to rotate based on one end being fixed to the housing 210 of the sensor bearing unit 200 so that the nozzle unit 320 that is fixed to the first link 331 rotates.

As an embodiment of the present disclosure, the nozzle unit 320 is fixedly positioned to the first link 331 while being mounted in the height direction and the vertical direction of the sensor 100. When the second link 332 pops up along the height direction of the sensor 100, the third link 333 integrally moves with the second link 332 in the height direction, and the second link 332 that is fastened to the first link 331 rotates. At the same time, the first link 331 is configured to rotate and move in the height direction and the horizontal direction of the sensor 100. Therefore, the nozzle unit 320 stands up at a position parallel to the sensor 100.

The washer fluid passage 500 is positioned so that washer fluid is sprayed from the vehicle body to the sensor 100. The washer fluid passage 500 is configured to be in fluid connection with the nozzle housing 310 of the nozzle assembly

300. In addition, an inlet end of the washer fluid passage 500 is configured to rotate in the same direction as the rotation direction of the sensor bearing unit 200 based on the central axis of the sensor 100, which is the rotation central axis of the sensor bearing unit 200. More specifically, the inlet end of the washer fluid passage 500 is provided with a washer fluid bearing 510. When the sensor bearing unit 200 rotates, the washer fluid passage 500 is configured to integrally rotate with respect to the washer fluid bearing 510. Accordingly, when the sensor bearing unit 200 rotates, twisting of the washer fluid passage 500 may be prevented.

As an embodiment of the present disclosure, the control unit 600 may determine the contaminated area outside the sensor 100 and control the driving amount of the motor unit 400 to move the sensor bearing unit 200 to the corresponding contaminated area. In addition, an opening amount of a valve (not illustrated) of the washer fluid passage 500 that is flowing into the nozzle assembly 300 may be controlled.

In addition, the control unit 600 may selectively drive the sequence of controlling the standing of the nozzle unit 320 of the nozzle assembly 300 and controlling the amount of rotation of the sensor bearing unit 200. Accordingly, the control unit 600 may control the valve of the washer fluid passage 500 so that the sensor bearing unit 200 rotates first and moves to the contaminated area of the sensor 100. Then the nozzle unit 320 of the nozzle assembly 300 stands up.

Conversely, the control unit 600 may control the motor unit 400 to drive the sensor bearing unit 200, and at the same time, control the nozzle unit 320 of the nozzle assembly 300 to stand up.

Figure 3:
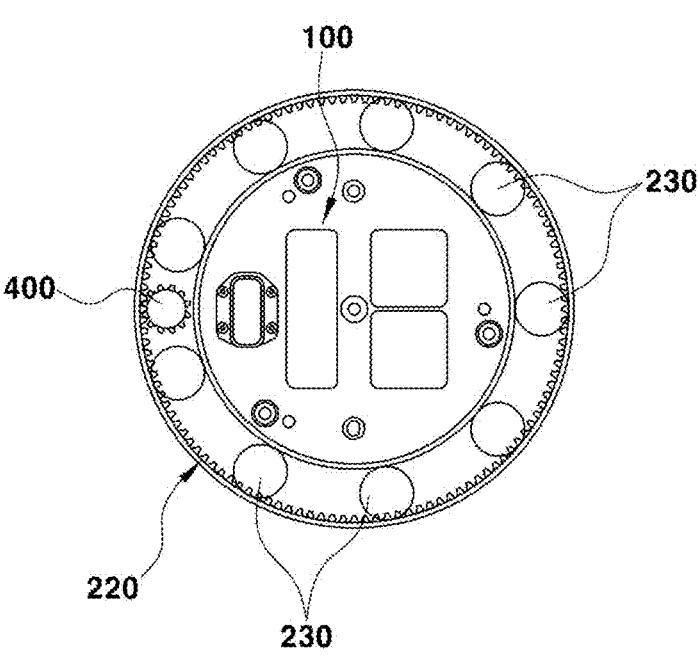
FIG. 3 is a rear view of a rotationally driven sensor bearing unit according to an embodiment of the present disclosure.

FIG. 3 illustrates a rear view of the bearing 230 positioned between the sensor bearing unit 200 and the sensor 100.

As an embodiment of the present disclosure, the sensor 100 is configured as the LIDAR, and the sensor 100 is configured to protrude to the outside of the vehicle body in a cylindrical shape. Moreover, the sensor bearing unit 200 is configured to surround at least a portion of the outer side surface of the cylindrical sensor 100 in the height direction.

Moreover, the sensor bearing unit 200 includes a housing 210 configured to surround the outer side surface of the sensor 100 and includes a motor unit 400 configured to contact an inner circumferential surface of the housing 210. More specifically, the sensor bearing unit 200 includes a gear unit 220 that is positioned on the inner circumferential surface of the housing 210 and fastened to the rotational shaft of the motor unit 400. In other words, the ring gear positioned on the inner circumferential surface of the housing 210 of the sensor bearing unit 200 rotates in response to the amount of rotation of a sun gear positioned on the rotational shaft of the motor unit 400. Thus, the housing 210 is configured to rotate based on the central axis of the sensor 100.

Moreover, at least one bearing 230 is provided between the housing 210 and the sensor 100. When the housing 210 of the sensor bearing unit 200 rotates, the bearing 230 performs a function of maintaining a gap between the sensor 100 and the housing 210 and maintaining a low friction state.

Figure 4A:
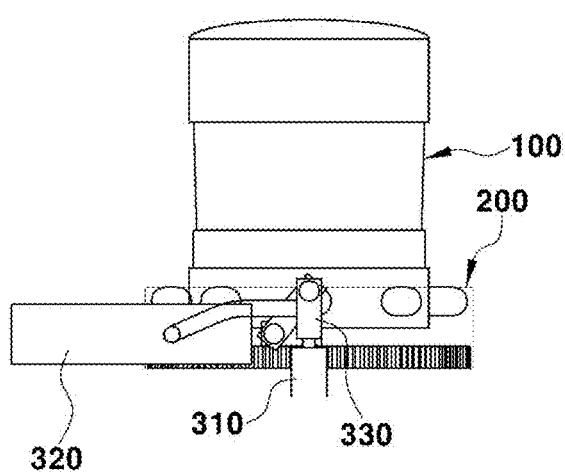
FIG. 4A is a side view of a state where a nozzle assembly of an apparatus for cleaning a sensor according to an embodiment of the present disclosure is mounted.
Figure 4B:
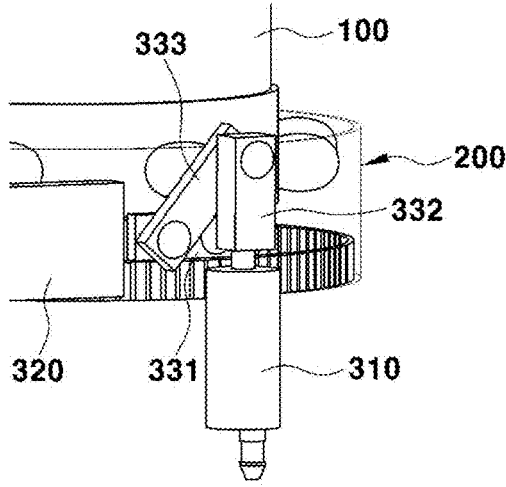
FIG. 4B is an enlarged view of a state where a nozzle assembly of the apparatus for cleaning a sensor according to an embodiment of the present disclosure is mounted.

FIGS. 4A and 4B illustrate a positional relationship of the nozzle assembly 300 in a state where the nozzle unit 320 is mounted.

As illustrated, the nozzle assembly 300, which is fixed to and positioned on the outer side surface of the sensor bearing unit 200, is positioned in the state where the nozzle unit 320 is mounted when the washer fluid set inside the nozzle housing 310 does not flow. More specifically, in an embodiment of the present disclosure, the nozzle unit 320 is mounted parallel to the longitudinal direction in which the housing 210 of the sensor bearing unit 200 is positioned.

Moreover, as illustrated in FIG. 4B, the link unit 330, which is fastened to the nozzle unit 320, is positioned so that the nozzle unit 320 is switched to a vertical state to a height direction of the sensor 100.

In other words, the second link 332 maintains a state of being drawn inside the nozzle housing 310, and the other end of the third link 333, fastened to the first link 331, is positioned to have a predetermined angle with respect to the longitudinal direction of the nozzle housing 310.

Moreover, the first link 331 maintains a mounted state based on the nozzle housing 310 along a direction substantially corresponding to the nozzle unit 320.

Figure 5A:
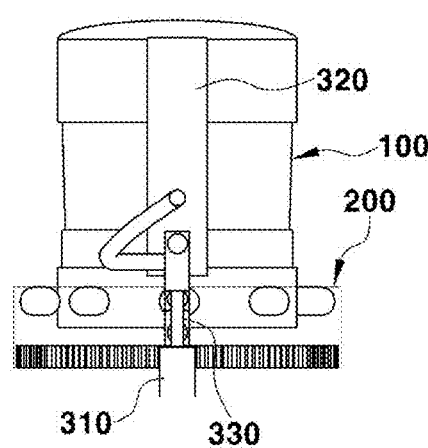
FIG. 5A is a side view of a state where a nozzle assembly of an apparatus for cleaning a sensor according to an embodiment of the present disclosure stands up.
Figure 5B:
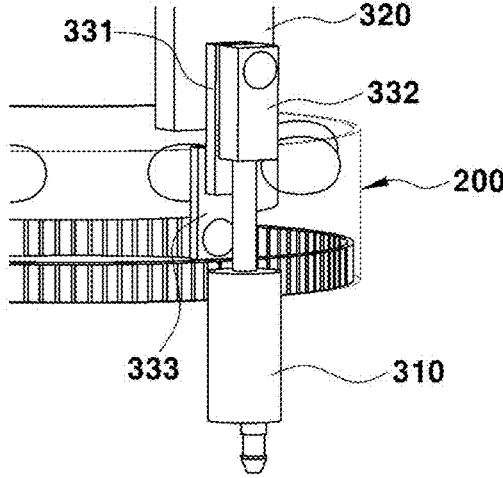
FIG. 5B is an enlarged view of a state where a nozzle assembly of the apparatus for cleaning a sensor according to an embodiment of the present disclosure stands up.

Thereafter, when the cleaning of the contaminated area of the sensor 100 is requested, the nozzle unit 320 is configured to perform the standing of the nozzle unit 320 as illustrated in FIGS. 5A and 5B.

As an embodiment of the present disclosure, the control unit 600 may determine the degree of contamination of the sensor 100 and is configured to specify the contaminated location. Therefore, when the request for cleaning for the contaminated area is applied from the control unit 600, the control unit 600 applies the driving force of the motor unit 400 to control the amount of rotation of the sensor bearing unit 200. Furthermore, a valve may be controlled so that the washer fluid flows into the washer fluid passage 500.

When the washer fluid flows into the nozzle housing 310 through the washer fluid passage 500, the second link 332 is configured to pop up to the outside of the nozzle housing 310. When the second link 332 extends along the height direction of the sensor 100, one end of the third link 333, which is rotatably fastened to the upper end of the second link 332, integrally moves with the upper end of the second link 332 in the height direction of the nozzle housing 310.

The other end of the third link 333 is fastened between both ends of the first link 331. Thus, the other end of the third link 333 integrally rotates with the first link 331 to a position close to the nozzle housing 310 based on the movement of the one end of the third link 333 in the height direction.

Moreover, the other end of the first link 331, at which the nozzle unit 320 is positioned, rotates opposite to the direction of rotation of the third link 333 based on one end of the first link 331 fastened to the sensor bearing unit 200 corresponding to the amount of rotation of the third link 333. Thus, the nozzle unit 320 moves to a position parallel to the height direction of the sensor 100.

More specifically, the third link 333 rotates in a counterclockwise direction based on one end being fastened to the second link 332. The first link 331, on the other hand, is configured to rotate clockwise at a fastening point where it is fastened to the third link 333 based on one end being fastened to the sensor bearing unit 200.

The nozzle unit 320 is configured to stand up in a position adjacent to the sensor 100 along the link unit 330 that is driven as discussed above. Moreover, the washer fluid flowing into the nozzle housing 310 is configured to be sprayed to the outer side surface of the sensor 100 along the injection passage 321 of the nozzle unit 320.

Figure 6:
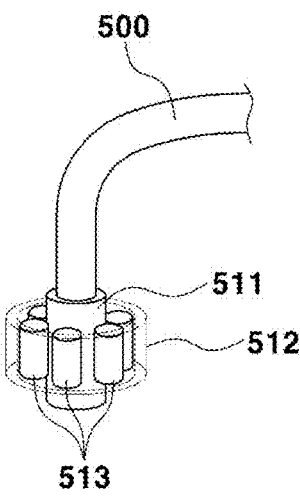
FIG. 6 is a diagram illustrating a configuration of a washer fluid bearing according to an embodiment of the present disclosure.

FIG. 6 illustrates a configuration of a washer fluid bearing 510 according to an embodiment of the present disclosure.

The present disclosure includes the washer fluid passage 500 fastened to a vehicle body passage (not illustrated) through which the washer fluid is applied from the vehicle body. The inlet end of the washer fluid passage 500 is provided with a washer fluid bearing 510 that is configured to be fastened to the vehicle body passage. Furthermore, the washer fluid bearing 510 is configured to rotate integrally with the rotation of the sensor bearing unit 200 independently of the vehicle body passage.

The washer fluid bearing 510 may be positioned corresponding to the same shaft as the rotational shaft of the sensor bearing unit 200. More specifically, the washer fluid passage 500 that is fastened to the washer fluid bearing 510 is configured to rotate based on the same axis as the central axis of the sensor 100 as a rotational shaft of the sensor bearing unit 200.

More specifically, the washer fluid bearing 510 includes an inner ring 511 to which the washer fluid passage 500 is fixed. The washer fluid passage 500 is fastened to the nozzle housing 310. The washer fluid bearing 510 also includes an outer ring 512 that is configured to surround the inner ring 511 at a predetermined gap from the inner ring 511. The outer ring 512 may be fastened and fixed to the vehicle body, and the inner ring 511 is configured to freely rotate based on the outer ring 512. Furthermore, the washer fluid bearing 510 includes a roller unit 513 that is positioned between the inner ring 511 and the outer ring 512. The roller unit 513 is configured so that the inner ring 511 may freely rotate based on the outer ring 512.

At least a portion of the roller unit 513 comes into contact with the outer circumferential surface of the inner ring 511 and at least a portion thereof comes into contact with the inner circumferential surface of the outer ring 512. Accordingly, when the inner ring 511 integrally rotates with the washer fluid passage 500, the inner ring 511 may maintain a predetermined gap from the outer ring 512 to maintain a low friction state.

Moreover, since the inner ring 511 may rotate integrally in response to the rotation of the sensor bearing unit 200, it is possible to prevent clogging of the passage. Clogging of the passage may occur due to the difference in the amount of rotation between the inlet end of the washer fluid passage 500 and one end fastened to the nozzle housing 310 in response to the rotation of the sensor bearing unit 200.

In summary, the washer fluid passage 500, including the washer fluid bearing 510 configured at a position substantially corresponding to the rotation center axis of the sensor bearing unit 200, is configured to prevent the clogging of the passage due to the rotation of the sensor bearing unit 200.

The present disclosure can obtain the following effects by combining the configuration, combination, and usage relationship described below with the previous embodiment.

The present disclosure has an effect of performing optimal cleaning of a sensor including a contaminated area through a sensor bearing unit of an apparatus for cleaning a sensor.

In addition, according to the present disclosure, a nozzle assembly may be switched from a mounted state to a standing state according to the flow of washer fluid, so that the washer fluid may be sprayed to a required position at a distance close to the sensor, thereby improving the cleaning performance. Additionally, the washer fluid naturally flows down from the surface of the sensor, minimizing unnecessary contamination of the surrounding area. After the washer fluid is sprayed, the nozzle assembly is switched to a stored state and does not invade the field of view (FOV) of the sensor.

Moreover, the present disclosure provides a structure in which washer fluid may be sprayed on the entire outer side surface of the sensor through one motor unit, and has an effect of simplifying a driving relationship of the apparatus for cleaning a sensor.

The present disclosure has been described in connection with what is presently considered to be practical embodiments. Although the embodiments of the present disclosure have been described, the present disclosure may also be used in various other combinations, modifications and environments. In other words, the present disclosure may be changed or modified within the range of the inventive concept disclosed in the specification, the range equivalent to the disclosure, and/or the range of the technology or knowledge in the field to which the present disclosure pertains. The described embodiments describe the best state for implementing the technical idea of the present disclosure, and various changes required in the specific application field and use of the present disclosure are possible. Therefore, it is to be understood that the disclosure is not limited to the disclosed embodiments. It is to be understood that other embodiments are also included within the spirit and scope of the appended claims.

REFERENCE SIGN LIST

10: Cleaning apparatus
100: Sensor
200: Sensor bearing unit
210: Housing
220: Gear unit
230: Bearing
300: Nozzle assembly
310: Nozzle housing
320: Nozzle unit
321: Injection passage
330: Link unit
331: First link
332: Second link
333: Third link
400: Motor unit
500: Washer fluid passage
510: Washer fluid bearing
511: Inner ring
512: Outer ring
513: Roller unit
600: Control unit

What is claimed is:

1. An apparatus for cleaning a sensor, the apparatus comprising:
   a sensor that is positioned in a vehicle;
   a sensor bearing unit that is positioned on a vehicle body adjacent to the sensor;
   at least one nozzle assembly positioned in the sensor bearing unit and configured to be raised by a hydraulic pressure of inflowing washer fluid;
   a washer fluid passage that is in fluid communication with the nozzle assembly and through which washer fluid flows; and
   a motor unit configured to apply a driving force so that the sensor bearing unit rotates based on a position of the sensor.

2. The apparatus of claim 1, wherein the sensor bearing unit includes:
   a housing to which the nozzle assembly is mounted;
   a gear unit that is positioned inside the housing and engaged with a rotational shaft of the motor unit; and
   bearings that are positioned outside the sensor and inside the housing.

3. The apparatus of claim 1, wherein the washer fluid passage is configured to be fastened to the nozzle assembly along the same shaft as a rotational shaft of the sensor bearing unit.

4. The apparatus of claim 3, wherein the washer fluid passage includes a washer fluid bearing that is formed at a position corresponding to the same shaft as the rotational shaft of the sensor bearing unit.

5. The apparatus of claim 1, wherein the nozzle assembly includes:
   a nozzle housing fastened to the washer fluid passage;
   a nozzle unit that sprays the washer fluid flowing into the nozzle housing; and
   a link unit that is positioned between the nozzle housing and the nozzle unit.

6. The apparatus of claim 5, wherein the link unit includes:
   a first link that has a first end fastened to the nozzle unit and a second end rotating along the sensor bearing unit;
   a second link fixed to the nozzle housing and configured to pop up along a height direction from the nozzle housing in response to the hydraulic pressure of the washer fluid; and
   a third link configured to apply a force so that the first link stands up when a first end of the third link is fastened to the second link, and a second end of the third link is fastened to the first link, and the second link pops up.

7. The apparatus of claim 6, wherein when the washer fluid flows into the nozzle housing, the second link pops up, the first end of the third link integrally moves with the second link along the height direction, and the second end of the third link integrally rotates with the first link.

8. The apparatus of claim 5, wherein the nozzle unit includes at least one injection passage along a longitudinal direction of the nozzle unit, and wherein the injection passage is configured to spray the washer fluid toward a lower end of the sensor.

9. An apparatus for cleaning a sensor, comprising:
   a sensor that is positioned in a vehicle;
   a sensor bearing unit that is positioned on a vehicle body adjacent to the sensor;
   at least one nozzle assembly positioned in the sensor bearing unit and configured to be raised by a hydraulic pressure of inflowing washer fluid;
   a washer fluid passage that is in fluid connection with the nozzle assembly and through which washer fluid flows;
   a motor unit configured to apply a driving force so that the sensor bearing unit rotates based on a position of the sensor; and
   a control unit configured to rotate the sensor bearing unit in response to a contaminated location of the sensor and apply the washer fluid to the nozzle assembly.

10. The apparatus of claim 9, wherein the sensor bearing unit includes:
   a housing to which the nozzle assembly is fastened;
   a gear unit that is positioned inside the housing and fastened to a rotational shaft of the motor unit; and
   bearings that are positioned outside the sensor and inside the housing.

11. The apparatus of claim 9, wherein the control unit is configured to control the motor unit so that the sensor bearing unit moves in response to the contaminated location of the sensor, and to control application of the washer fluid to the nozzle assembly.

12. The apparatus of claim 9, wherein the control unit controls the washer fluid to be applied to the nozzle assembly simultaneously with driving of the motor unit when the contaminated location of the sensor is determined.

13. The apparatus of claim 9, wherein the nozzle assembly includes:

a nozzle housing fastened to the washer fluid passage;

a nozzle unit that sprays the washer fluid flowing into the nozzle housing; and a link unit positioned between the nozzle housing and the nozzle unit.

14. The apparatus of claim 13, wherein the link unit includes:

a first link that has a first end fastened to the nozzle unit and a second end rotating along the sensor bearing unit;

a second link that is fixed to the nozzle housing and pops up along a height direction from the nozzle housing in response to the hydraulic pressure of the washer fluid; and a third link that applies force so that the first link stands up when a first end of the third link is fastened to the second link, a second end of the third link is fastened to the first link, and the second link pops up.

15. The apparatus of claim 14, wherein when the washer fluid flows into the nozzle housing, the second link pops up, the first end of the third link integrally moves with the second link along the height direction, and the second end of the third link integrally rotates with the first link.

16. The apparatus of claim 14, wherein the nozzle unit includes at least one injection passage along a longitudinal direction of the nozzle unit, and wherein the injection passage is configured to spray the washer fluid toward a lower end of the sensor.

17. The apparatus of claim 9, wherein the washer fluid passage includes a washer fluid bearing that is formed at a position corresponding to the same shaft as a rotational shaft of the sensor bearing unit.

18. The apparatus of claim 17, wherein the washer fluid bearing includes:

an inner ring in which the washer fluid passage is positioned;

an outer ring configured to surround the inner ring to have a predetermined distance from the inner ring; and a roller unit that is positioned between the inner ring and the outer ring and is configured so that the inner ring rotates relative to the outer ring.

* * * * *